Figure 1:
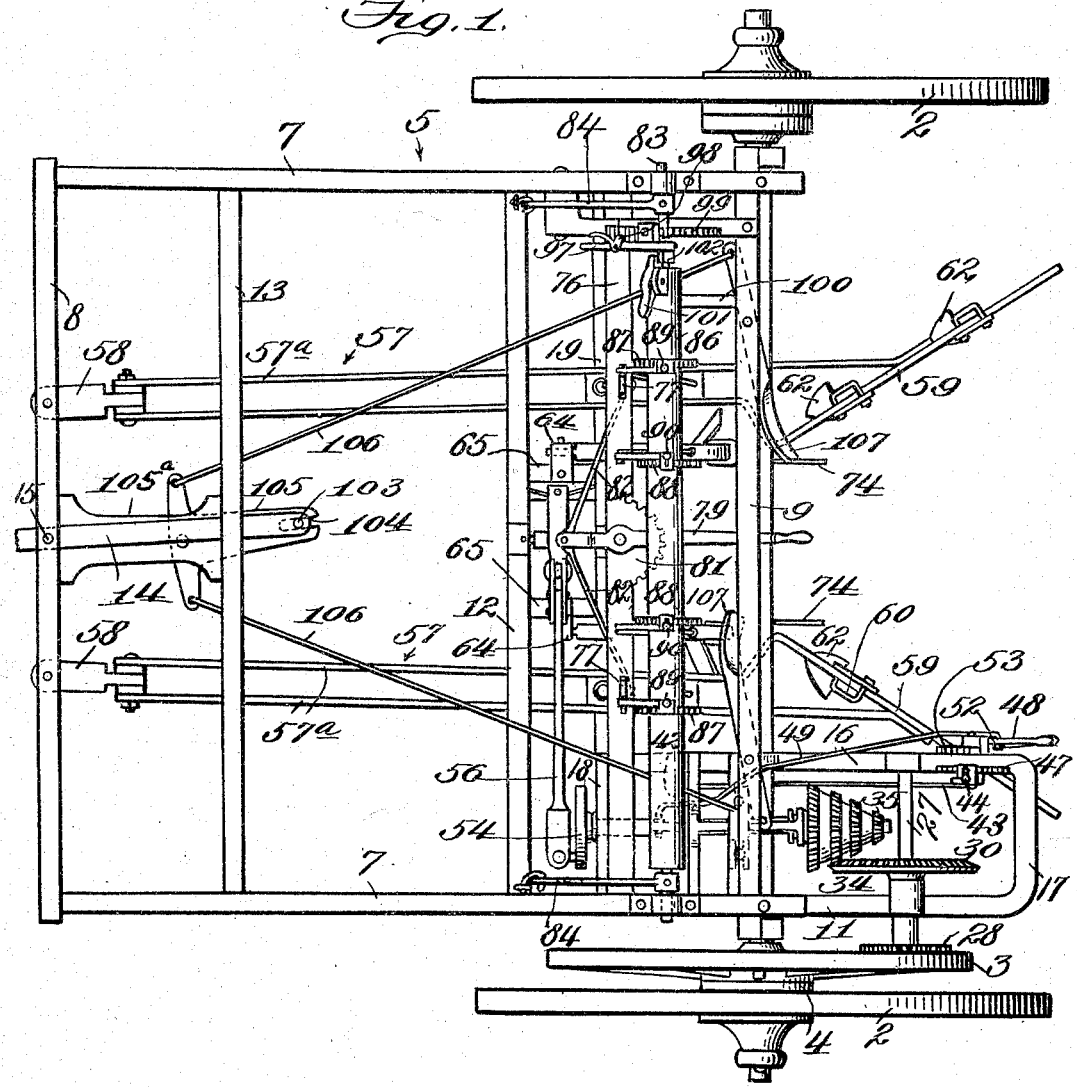

R. L. HARTSELL.
COTTON CHOPPER.
APPLICATION FILED APR. 23, 1909.

947,638.

Patented Jan. 25, 1910.

4 SHEETS—SHEET 1.

Witnesses:

Inventor
Robert L. Hartsell
By James L. Norris
Atty

R. L. HARTSELL.
COTTON CHOPPER.
APPLICATION FILED APR. 23, 1909.
947,638.
Patented Jan. 25, 1910.
4 SHEETS—SHEET 2.
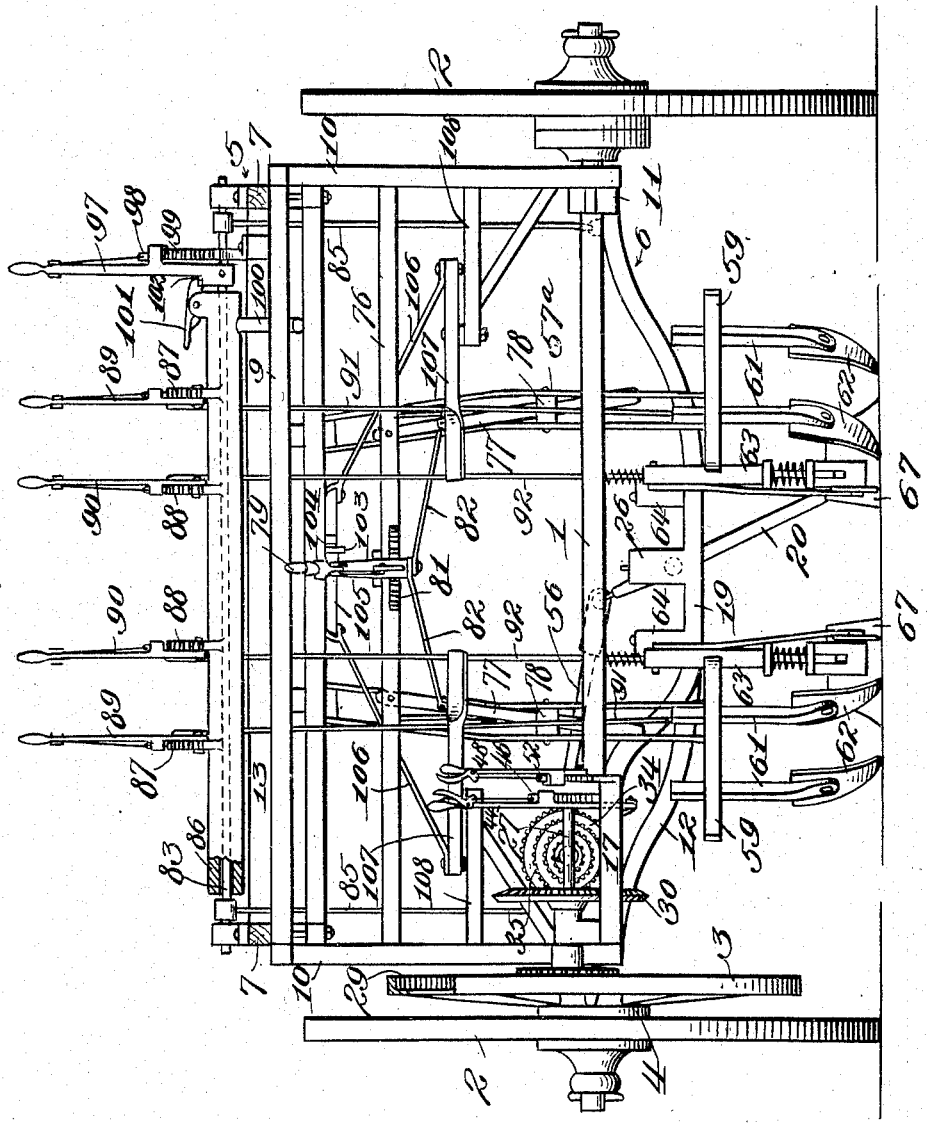
Witnesses:
Inventor
Robert L. Hartsell
By
James L. Norris
Atty.

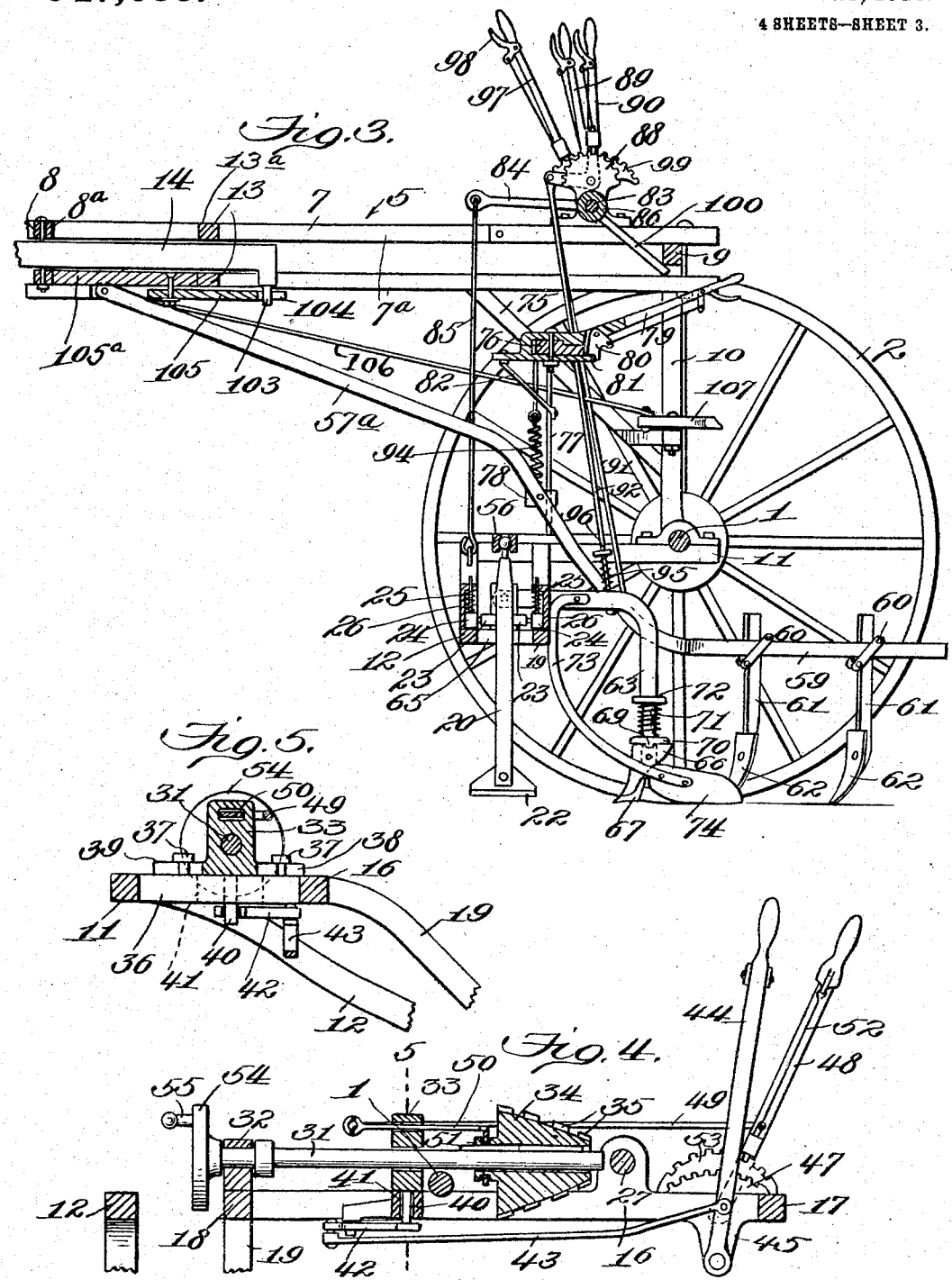

R. L. HARTSELL.
COTTON CHOPPER.
APPLICATION FILED APR. 23, 1909.
947,638.
Patented Jan. 25, 1910.
4 SHEETS—SHEET 4.
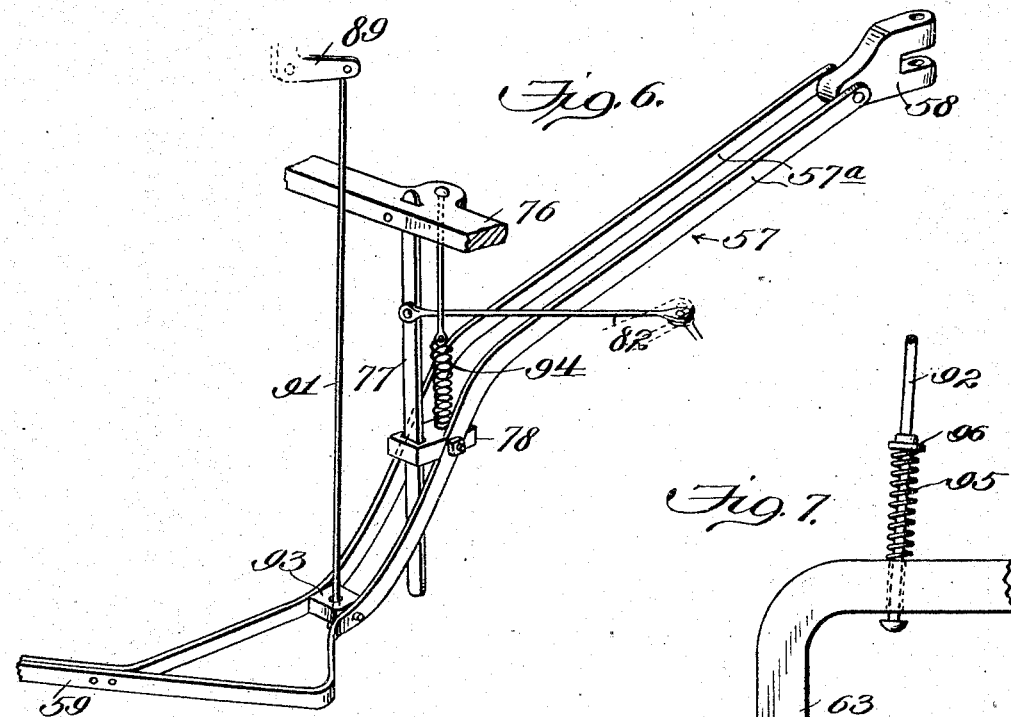
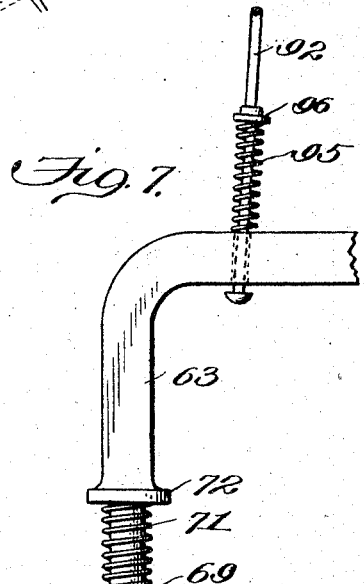
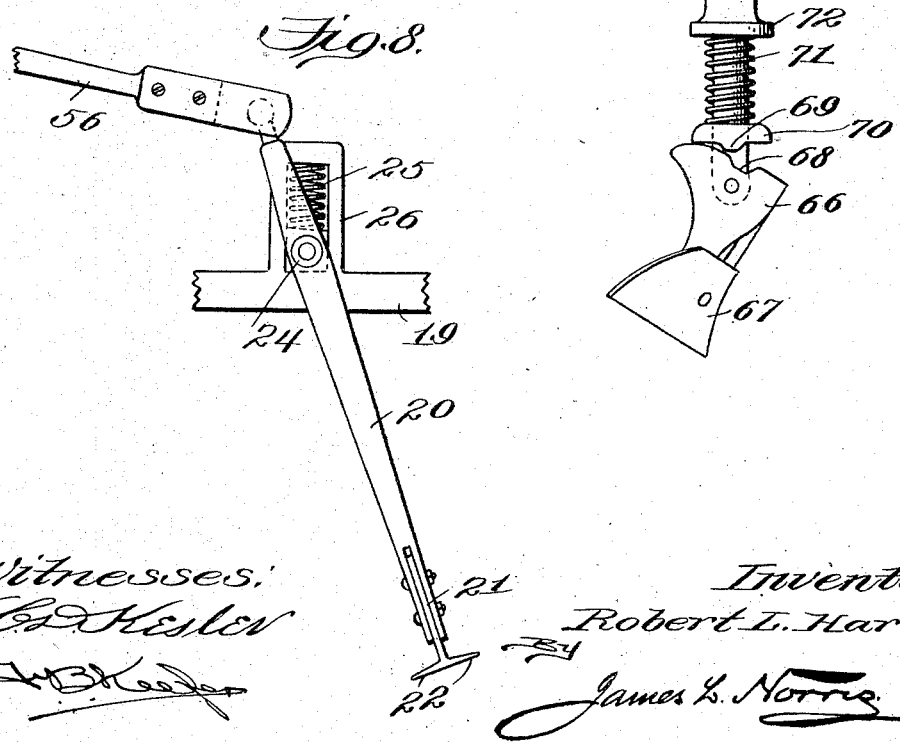
Witnesses:
Inventor
Robert L. Hartsell
By James L. Norris
Atty

UNITED STATES PATENT OFFICE.

ROBERT LEE HARTSELL, OF SMITHS FORD, NORTH CAROLINA.

COTTON-CHOPPER.

947,638.  Specification of Letters Patent.  Patented Jan. 25, 1910.

Application filed April 23, 1909. Serial No. 491,710.

*To all whom it may concern:*

Be it known that I, ROBERT LEE HARTSELL, a citizen of the United States, residing at Smiths Ford, in the county of Cabarrus and State of North Carolina, have invented new and useful Improvements in Cotton-Choppers, of which the following is a specification.

This invention relates to new and useful improvements in cotton choppers and has more particular reference to a cotton chopper of that type which embodies an oscillating double edged hoe which operates on each stroke thereof. Structures of this type also include cultivators which follow the hoe to loosen the soil and to turn loose soil back upon the row.

The invention aims as a primary object to provide means whereby the several adjuncts of the machine may be adjusted independently of one another and of the hoe; to provide further means whereby the hoe may be raised or lowered independently of the adjunctive elements; and to provide further means whereby all the adjustable elements may be simultaneously raised or lowered with the hoe when the means for raising or lowering the latter is operated.

The invention aims as a further object to provide novel gearing whereby the number of strokes of the hoe with respect to a revolution of the driving wheel may be varied, thereby varying the distance between the cotton plants which are left standing in the row.

The invention aims as a further object to provide a novel construction of scrapers, the novelty residing more particularly in pivotally mounting the scraper beams for horizontal movement, in pivotally mounting the scraper blades upon said beams, and in providing spring operated yieldable means for holding the scraper blades in their proper working positions and for restoring the same to such positions after any movement thereof on their pivots.

The invention aims as a further object to provide novel means for laterally shifting the cultivator blades, as in avoiding stones or other obstacles.

In the accompanying drawings I have illustrated a preferred and advantageous embodiment of the invention, the structural details of which will be set forth at length in the following description, while the novel features by which the invention is distinguished from the prior art will be recited in the claims appended at the end of the description.

In the said drawings: Figure 1 is a top plan view of a cotton chopper constructed in accordance with the present invention. Fig. 2 is a rear elevation thereof. Fig. 3 is a central longitudinal sectional view thereof, a number of the parts appearing in elevation. Fig. 4 is a central longitudinal section of the adjustable gearing by which the hoe is operated from the driving wheel. Fig. 5 is a detail cross sectional view on the line 5—5 of Fig. 4. Fig. 6 is a detail perspective view of one of the cultivator beams and its adjuncts, the other beam being similarly constructed. Fig. 7 is a detail side elevation of the scraper mechanism. Fig. 8 is a detail end elevation of the oscillating hoe and its adjuncts.

Similar characters of reference refer to corresponding parts throughout the several views.

The machine as an entirety is suspended from a main shaft or axle 1, which carries at its ends traction wheels 2. One of the wheels 2 is utilized to rotate the drive wheel 3 and accordingly a ratchet clutch mechanism, as 4, is employed, such clutch mechanism being shown conventionally by an illustration of the casing thereof. Inasmuch as such mechanism is structurally independent of the present invention and may be of any approved form, further illustration thereof is deemed unnecessary. It will be understood that the wheel 2 on its forward rotation is coupled to the wheel 3 by the clutch mechanism 4, driving the said wheel 3, and that in case the machine is backed, as in turning at the end guide row, the wheel 3 is not rotated.

The machine embodies two frames, the one being an upper frame which is designated generally by the numeral 5 and the other being a lower frame which is designated generally by the numeral 6. The frame 5 includes longitudinal side bars, as 7, which are connected at their front ends by a front cross bar, as 8, and at their rear ends by a rear cross bar, as 9. Connected to the ends of the bar 9 are vertical bars, as 10, which depend and at their lower ends surround the shaft 1. The frame 6 includes essentially a pair of forwardly projecting bars, as 11, which at their rear ends pivotally surround the shaft 1 and at their front ends are connected by a curved, bow-shaped front cross bar, as 12. The bars 7 are also connected by a cross bar 13 which is located some distance in the rear of the bars 8. The bars 7, 8 and 13 are preferably made in upper and lower sections, as 7ª, 8ª and 13ª, respectively, which are suitably spaced from one another and which provide for the convenient assemblage of the draft pole of the machine, such pole being indicated by the numeral 14 and being pivoted, as at 15, between the sections 8ª of the bar 8.

At the left hand side of the frame 6 an auxiliary gear frame is provided. The latter is constructed by extending the left hand bar 11 rearwardly and by providing a bar 16 which is parallel to the bar 11 and is connected thereto at its rear end by a cross bar 17 and at its front end by a cross bar 18. The bar 16 is also connected to the bar 11 at the right hand side of the machine by a curved, bow-shaped cross bar 19 which is located a short distance rearwardly of the bar 12.

The cotton chopping hoe is shown in its relation to the other elements of the machine more particularly in Fig. 3 and comprises an oscillating lever, as 20, which carries at its lower end a cutting member, designated generally as 21. The latter is of substantially inverted T-shape and has oppositely projecting blades, as 22, one blade 22 cutting the cotton on one stroke of the lever and the other blade cutting the cotton on the opposite stroke of the lever. The lever 20 is pivotally supported between the bars 12 and 19 and accordingly is provided with oppositely extending trunnions, as 23. Bearings 24 are provided for the trunnions 23 and are held normally against the respective bars 12 and 19 by springs, as 25. Said bearings and said springs are confined in casings 26 which are mounted upon the bars 12 and 19 and which serve as guides for the bearings 24 in their yieldable movement, as when the hoe encounters an obstacle or some other surface irregularity. The arrangement of the bearings 24, springs 25 and casings 26 is illustrated in detail in Fig. 8.

The gearing by which the oscillating wheel is driven from the wheel 3 will now be described.

The bars 11 and 16 are provided with bearings for a transverse shaft 27 which has a projecting outer end portion upon which is mounted a spur wheel 28. The latter is in gear with internal spur teeth 29 which are formed on the peripheral flange of the wheel 3. The shaft 27 carries between the bars 11 and 16 and near the bar 11 a bevel pinion, as 30 (Fig. 1), the latter being employed to drive a longitudinal shaft 31. The shaft 31 is journaled in suitable bearings, as 32 and 33, illustrated more particularly in Fig. 4. The bearing 32 is supported upon the cross bar 18 and the bearing 33 is located rearwardly of the bearing 32 and is supported in a manner to be later described. The shaft 31 carries upon its inner end a cone, as 34, which is provided at suitable intervals with annular rows of teeth, as 35. The pinion 30 may mesh with any desired row of teeth 35 in accordance with the number of oscillations which it is desired for the hoe to have with relation to a revolution of the wheels 2. In order that the engagement of the pinion 30 with any desired row of teeth 35 may be effected, the shaft 31 has a certain degree of play in its bearing 32 and means are provided for moving the cone 34 axially of the shaft 31 and also, together with said shaft, laterally with respect to the pinion 30. The bearing 33 is mounted to slide upon a cross bar, as 36, which is supported between the bars 11 and 16 and which is provided with headed bolts or pins, as 37, that project through longitudinal slots, as 38, formed in laterally extended flanges 39 of the bearing 33. The pins or bolts 37 thus serve as guides for said bearing in its lateral movement. The bearing 33 is also provided with a depending pin, as 40, which projects through a slot, as 41, formed in the cross bar 36. The pin 40 is connected to one leg of a bell crank lever, as 42, which is pivoted to an extension of the cross bar 36. A link, as 43, is pivoted to the other leg of the lever 42 and extends rearwardly. The link 43 is pivoted at its rear end to a lever 44 above the pivot of the latter. The lever 44 is pivoted to a depending bracket, as 45, which is carried by the bar 16 and is held in any position to which it may be moved by a suitable manually operated pawl, as 46, which engages between the teeth of a rack quadrant, as 47, the latter being supported at one side of the bar 16, as shown in Figs. 1, 2 and 4. It will thus be seen that the lever 44 may be operated to move the shaft 31 laterally and therewith the cone 34. In accordance with the present arrangement of parts, the forward movement of the lever 44 results in a movement of the shaft 31 away from the pinion 30 and a rearward movement of the lever 44 results in a movement of the shaft 31 toward the pinion 30. This mechanism provides for effectively engaging and disengaging the cone 34 and the pinion 30. In the operation of changing the position of the cone when it is desired to effect an engagement of some particular row of teeth 35 with the pinion 30, the necessary lateral movement of the shaft 31 is provided for by making the leg of the lever 42 to which the pin 40 is connected, of spring steel, having sufficient yielding property to permit of the lateral movement of the shaft 31 under the circumstances stated.

Instead of the pinion 30 and cone 34 a friction drive may be employed. This construction is so well known that its illustration is deemed unnecessary, the only difference being that in the case of a friction drive, a lateral movement of the shaft 31 in the operation of relatively positioning the transmission wheels is not necessary. Such a friction drive as I have in mind is illustrated in U. S. Patent No. 559,938, to Dunlap, granted May 12, 1896.

Means are also provided for moving the cone 34 axially, preferably with respect to the shaft 31, as in the operation of changing from one row of teeth 35 to another. Such means preferably comprises a lever, as 48, which is pivoted at one side of the bar 16 and which has connected thereto above its pivot, a link, as 49. The latter is connected at its forward end to the longitudinally disposed shank portion of a fork 50. Said shank portion slides axially through an opening in the bearing 33 and has its bifurcated end engaged in the groove of a hub 51, which is provided at the forward end of the cone 34. The lever 48 is secured in any desired position at which it may be set by a manually operated pawl, as 52, which coöperates with a rack quadrant, as 53, also mounted at one side of the bar 16, as shown in Figs. 1, 2 and 4.

The shaft 31 carries on its forward end a disk 54, from which projects a crank pin 55. The pin 55 has a spherical head which is connected in the manner of a universal joint to the end of a link, as 56. The latter extends transversely of the machine and its other end is connected also in the manner of a universal joint to the upper end of the lever 20. The universal joint connection between the crank pin 55 and the link 56 allows of a certain relative movement between the disk 54 and said link when the shaft 31 is moved laterally in the manner described.

From the foregoing it will be seen that the wheel 3 through the agency of the pinion 28, drives the pinion 30 and the latter drives the cone 34 and the shaft 31. The movement of the shaft 31 is transmitted to the oscillating hoe lever by the link 56 through the agency of the disk 54 and crank pin 55.

The cultivator beams are indicated by the numeral 57 and each preferably comprises a pair of spaced metallic bars, as 57ª. The bars 57ª are so shaped that they may be connected to one another at their rear ends and at their forward ends they are pivoted for vertical movement to blocks, as 58. The blocks 58 are in turn pivoted for horizontal movement between the sections 8ª of the front cross bar 8 of the frame 5. The beams 57 extend rearwardly and downwardly and at their rear ends terminate in horizontal end portions 59 which extend rearwardly and divergently with relation to one another and to which are attached, as by suitable clamping means 60, depending shanks 61, each of the latter carrying a cultivator blade, as 62. The portions 59 thus provide for the assemblage of a gang of cultivator blades at each side of the machine. The scrapers are located in advance of the blades 62 and rearwardly of the hoe. The scraper beams are indicated by the numeral 63 and are of substantial L-shape, being pivoted at their forward ends for vertical movement to blocks, as 64, which latter are pivoted for horizontal movement upon members 65 which extend between the bars 12 and 19. To the lower ends of the beams 63, shanks, as 66, are pivoted for forward and rearward movement and the latter carry the scrapers 67. The construction of the beams 63 and shanks 66 is illustrated in detail in Fig. 7. Each shank 66 is formed in its upper face with a notch, as 68, in which is normally engaged a tooth, as 69, which is formed on the under face of a collar, as 70. The latter slidably surrounds the lower portion of the beam 63 and is held with its tooth 69 engaged in the notch 68 by means of an expansive coil spring, as 71, which surrounds the beam 63, bearing at its lower end against the collar 70 and at its upper end against a flange 72 which is provided on said beam. The collars 70 are employed to maintain the shanks 66 and the scrapers connected thereto in proper working positions and at the same time to permit of said shanks moving pivotally when riding over stones or other surface irregularities. Such pivotal movement is prevented from being too free and is resisted to the necessary extent by the springs 71. Rearwardly extending shanks 73 are also secured to the beams 63 and carry at their lower ends vertically disposed blades, as 74, which follow the scrapers 67 and assist the latter in their function of stripping young grass and weeds from the sides of the row prior to the turning back of loose soil by the innermost pair of cultivator blades.

As was stated in the introductory paragraphs of the specification, the invention includes novel means for laterally shifting the cultivator beams when it is desired to avoid large stones or other obstacles, and a preferred embodiment of such means will now be described.

Each correspondingly located pair of bars 7 and 10 of the frame 5, is connected by a diagonal brace member, as 75. The members 75 support a transverse bar 76, to which a pair of levers, as 77, are pivoted for transverse swinging movement. The levers 77 are located at each side of the bar 76 equidistant from the center thereof and depend therefrom, the lower end portions of said levers passing loosely through openings in blocks, as 78, which are held between the bars 57ª of the cultivator beams 57. The levers 77 and blocks 78 are thus in effect pivotally and slidably related for purposes which will be later explained and the relation thereof is illustrated in detail in Fig. 6. Centrally located upon the bar 76 is a lever, as 79, which is mounted for horizontal swinging movement and is provided with a manually operated pawl, as 80, the latter coöperating with a rack quadrant, as 81, by means of which the lever 79 is held in any desired position in which it may be set. The lever 79 has a forwardly projecting end portion, to which links, as 82, are pivoted and the latter extend in opposite directions and at their outer ends are pivoted to the respective levers 77 below the pivots of the latter. It will be apparent that if the lever 79 is shifted to the right the beams 57 are shifted to the left and therewith the blades 62, and if the lever 79 is shifted to the left, the beams 57 and therewith the blades 62 are in like manner shifted to the right.

I will now describe a preferred embodiment of the several means by which the hoe, the beams 57 and the beams 63 may be independently raised or lowered, or raised or lowered together.

The bars 7 are provided near their rear ends with bearings for a transverse shaft 83 which carries near its ends forwardly projecting arms, as 84. The arms 84 are connected by links, as 85, to the frame 6, the links 85 being directly connected to the front cross bar 12 of said frame near its ends. It will be apparent that when the shaft 83 is turned in either direction, the frame 6 and therewith the lever 20 is raised or lowered as the case may be. Surrounding the shaft 83 is a hollow shaft 86 upon which are mounted a pair of rack quadrants, as 87, and between the latter a second pair of rack quadrants, as 88. Levers 89 are pivoted to the rack quadrants 87 and have manually operated pawls for coöperation therewith, and levers 90 are pivoted to the rack quadrants 88, the latter also having manually operated pawls for coöperation with said quadrants. The levers 89 and 90 are of substantial L-shape and the former are connected by links, as 91 to the corresponding beams 57 and the latter are connected by links, as 92, to the corresponding beams 63. The connection between the links 91 and 92 and their respective levers and beams is of loose nature in order to allow for the necessary lateral play of said beams under certain conditions. In Fig. 6 the link 91 is shown in detail as being connected to a block, as 93, which is held between the bars 57ª of the beam 57, the said block being capable of sliding on the link, as when the beam 57 is raised or lowered by reason of the surface irregularities of the ground, and it should be here stated that the levers 77 and blocks 78 are relatively slidable for the same reason, said levers passing loosely through openings in said blocks. In order to prevent the blades 62 from taking too deeply into the ground, retractile coil springs, as 94, are provided, such springs being connected at their lower ends to the blocks 78 and at their upper ends to pins which depend from the cross bar 76. The links 92 are passed loosely through openings in the beams 63 and thus a slidable relation between each beam and its link 92 is provided for in order to allow of the beams yielding pivotally under certain circumstances, as when the scrapers encounter an obstacle. In order to prevent the upward pivotal movements of the beam 63 from being too free and also in effect to cushion such pivotal movements, springs, as 95, are provided, the latter surrounding the links 92, bearing at their lower ends against the beams 63 and at their upper ends against collars, as 96, which are provided on said links. This arrangement is illustrated in detail in Fig. 7.

It will be apparent that the several levers 89 and 90 may be manipulated independently of one another and consequently the beams 57 may be raised or lowered independently of one another and of the beams 63 and the latter may also be similarly operated. By turning the shaft 83 and holding the sleeve 86 stationary, the hoe may be raised or lowered independently of the scrapers and beams. For the purpose of turning the shaft 83, a lever, as 97, is provided which is fast on said shaft at one end thereof and which carries a manually operated pawl, as 98, for coöperation with a rack quadrant, as 99. It will be apparent that by moving the lever 97 rearwardly, the frame 6 and therewith the hoe is raised and by moving the lever forwardly, the frame 6 and therewith the hoe is lowered. For the purpose of holding the sleeve 86 and the beams 57 and 63 stationary, during the turning of the shaft 83, in order that the raising and lowering of the hoe may be independent of the scrapers and cultivators, the sleeve 86 is provided with a rearwardly extending arm, as 100, which engages the bar 9 in the manner shown in Fig. 3 and positively holds the sleeve against movement.

Should it be desired to move the hoe and the scrapers and cultivators together, as when lifting them all away from the ground or when returning them to the ground, means are provided for connecting the sleeve 86 to the lever 97, in order that said sleeve and said lever and with the latter the shaft 83, may be turned together and such means preferably comprises a pivoted spring pressed finger, as 101, which is mounted at one end of the sleeve 86 and which is held by its spring in engagement with a recessed hub extension, as 102, of the lever 97. It will be apparent that the finger 101 may be moved in any suitable manner either manually or by the operator's foot, out of engagement with the extension 102 to permit of the shaft 83 turning relatively to the sleeve 86 in the manner described. This arrangement is shown in detail in Fig. 9.

The organization of the machine is of such nature that it is preferable to employ means by which the pivotal movements of the draft pole 14 can be positively controlled by the operator whose seat (not shown) is suitably supported over the rear portion of the frame of the machine in any suitable manner. A preferred embodiment of such means is illustrated in Fig. 1. As was stated, the draft pole 14 is pivoted to the bar 8. Said pole has a portion thereof projecting rearwardly from said bar and provided with a depending pin, as 103, which engages in a slot, as 104, formed in the central leg of a T-shaped lever 105. The lever 105 is pivoted at the junction of its several legs to a plate 105ª which extends between the bars 8 and 13 and is supported thereby. The oppositely extending legs of the lever 105 are pivotally connected to links 106, and the latter extend rearwardly and at their rear ends are in turn connected to respective levers 107. The levers 107 are pivoted for horizontal movement to brackets 108 which are suitably supported from the frame 5 directly below the rear cross bar 9. Said levers are foot operated and either one or the other may be operated in accordance with the direction in which it is desired to turn the draft pole. By pushing forwardly on the left hand lever 107 the pole 14 is turned to the left and by pushing forwardly on the right hand lever 107 the pole 14 is in like manner turned to the right.

The manner of use will be readily apparent from the foregoing description. As the machine advances, the hoe in its oscillatory movement chops the cotton at regular intervals and is followed up by the scrapers 67 and the blades 74 which scrape the young grass and weeds from the sides of the row. The scrapers are in turn followed by the cultivator blades 62, the innermost pair of which turns the loose soil back upon the row in the well known manner. The beams 63 which carry the scrapers 67 by virtue of their horizontal pivotal movement, adjust themselves to the width of the row and may be set at any desired distance into the ground by properly manipulating the levers 90. The blades 62 may be similarly set by properly manipulating the levers 89 and may be shifted laterally as in passing large stones or other surface irregularities.

The machine may be thrown out of gear when desired by properly manipulating the lever 44, and the scrapers, the cultivator blades and the hoe may be independently lifted away from the ground and consequently rendered inoperative when desired. The springs 25, 71, 94 and 95 provide an efficient means for cushioning the movements of the several parts in compensating for surface irregularities.

The chopping hoe and its adjuncts are supported from the lower frame 6 and the cultivator beams are supported from the upper frame 5. With this fact in mind, it will be understood that by taking apart certain bearing parts which connect the axle and the frame 6, the latter may be removed and the frame 5 with its adjuncts may be used as an ordinary cultivator.

Having fully described my invention, I claim:

1. In a cotton chopper, in combination, a hoe, cultivator blades disposed rearwardly thereof, means for raising and lowering the hoe independently of the blades, means for raising and lowering the blades independently of one another and of the hoe and means whereby the hoe and the blades may be raised or lowered together.

2. In a cotton chopper, in combination, a hoe, a frame to which the hoe is connected, a transverse partially rotatable shaft, means connecting the shaft and the frame whereby the latter is raised or lowered when the former is turned in either direction, a lever fast on the shaft, a pair of beams pivoted for vertical movement and carrying cultivator blades, a hollow shaft surrounding the first named shaft, a pair of levers on the hollow shaft for raising and lowering the beams, means connecting the levers and the beams, and means for connecting the hollow shaft to said first named lever for operation thereby with said first named shaft.

3. In a cotton chopper, in combination, a hoe, vertically movable means carrying the hoe, a lever for raising and lowering the hoe carrying means, means operatively connecting the lever and the hoe carrying means, a pair of vertically movable beams carrying cultivator blades in the rear of the hoe, levers for raising and lowering the beams, means operatively connecting the last named levers and the beams, and means whereby one of said levers may be operated to simultaneously raise or lower both the hoe and the beams.

4. In a cotton chopper, in combination, an oscillating lever carrying a hoe and provided with trunnions, yieldable spring pressed bearings receiving said trunnions and means for oscillating the lever.

5. In a cotton chopper in combination, a main shaft carrying traction wheels, upper and lower frames pivoted on the main shaft, a hoe carried by the lower frame, means for operating the hoe, and means on the upper frame for raising and lowering the lower frame and therewith the hoe, with respect to the upper frame.

In testimony whereof I have hereunto set my hand in presence of two subscribing witnesses.

ROBERT LEE HARTSELL.

Witnesses:
    JASON OSBORN,
    BUNYAN GOVE.